(12) United States Patent
Tsuchizawa et al.

(10) Patent No.: US 10,259,529 B2
(45) Date of Patent: Apr. 16, 2019

(54) BICYCLE CONTROLLER AND BICYCLE CONTROLLING METHOD

(71) Applicant: Shimano Inc., Sakai, Osaka (JP)

(72) Inventors: Yasuhiro Tsuchizawa, Osaka (JP); Hiroshi Matsuda, Osaka (JP)

(73) Assignee: Shimano Inc., Osaka (JP)

( * ) Notice: Subject to any disclaimer, the term of this patent is extended or adjusted under 35 U.S.C. 154(b) by 135 days.

(21) Appl. No.: 15/672,879

(22) Filed: Aug. 9, 2017

(65) Prior Publication Data

US 2018/0050761 A1 Feb. 22, 2018

(30) Foreign Application Priority Data

Aug. 18, 2016 (JP) .................... 2016-160498

(51) Int. Cl.
*B62M 6/45* (2010.01)
*B60L 11/00* (2006.01)
*B60L 15/20* (2006.01)

(52) U.S. Cl.
CPC .............. *B62M 6/45* (2013.01); *B60L 11/007* (2013.01); *B60L 15/20* (2013.01); *B60L 2200/12* (2013.01); *B60L 2240/12* (2013.01); *B60L 2240/486* (2013.01); *B60L 2240/622* (2013.01); *B60L 2240/642* (2013.01); *Y02T 10/645* (2013.01); *Y02T 10/72* (2013.01); *Y02T 10/7275* (2013.01); *Y02T 10/7291* (2013.01); *Y02T 90/16* (2013.01); *Y02T 90/162* (2013.01)

(58) Field of Classification Search
CPC . B62M 6/40; B62M 6/45; B60L 15/02; B60L 11/007
See application file for complete search history.

(56) References Cited

U.S. PATENT DOCUMENTS

| | | | |
|---|---|---|---|
| 9,162,730 B2 * | 10/2015 | Tanaka | B60L 11/007 |
| 2015/0057855 A1 | 2/2015 | Stegmaier | |
| 2018/0257743 A1* | 9/2018 | Tsuchizawa | B62M 25/08 |
| 2018/0268668 A1* | 9/2018 | Tetsuka | G01C 9/06 |

FOREIGN PATENT DOCUMENTS

| | | | | |
|---|---|---|---|---|
| JP | 05-246378 A | | 9/1993 | |
| JP | 08-058669 A | | 3/1996 | |
| JP | 10-076987 A | | 3/1998 | |
| JP | 2005041352 A | * | 2/2005 | ............. B62M 6/50 |
| JP | 4129084 B2 | | 7/2008 | |

* cited by examiner

*Primary Examiner* — Kevin Hurley
(74) *Attorney, Agent, or Firm* — Global IP Counselors, LLP (57) ABSTRACT

A bicycle controller and a bicycle controlling method reduces a distance a bicycle travels before a motor is stopped regardless of whether pedaling is stopped in a state where a rotation speed of the crank is high. The bicycle controller includes an electronic control unit that controls a motor, which assists pedaling of a bicycle, based on a manual driving force and angle information related to an angle of a crank of the bicycle. If the crank is rotated by a predetermined angle or greater in a state where the manual driving force is less than or equal to a predetermined threshold value while the motor is driven, then the electronic control unit stops the motor.

16 Claims, 8 Drawing Sheets

BICYCLE CONTROLLER AND BICYCLE CONTROLLING METHOD

CROSS-REFERENCE TO RELATED APPLICATIONS

This application claims priority to Japanese Patent Application No. 2016-160498, filed on Aug. 18, 2016. The entire disclosure of Japanese Patent Application No. 2016-160498 is hereby incorporated herein by reference.

BACKGROUND

Field of the Invention

The present invention generally relates to a bicycle controller and a bicycle controlling method.

Background Information

Japanese Patent No. 4129084 (Patent Document 1) discloses a bicycle controller that controls a motor, which assists pedaling of a bicycle, based on manual driving force. The bicycle controller stops the supply of current to the motor after a state in which the manual driving force is less than or equal to a first threshold value continues for a predetermined time.

SUMMARY

Since the bicycle controller of Patent Document 1 stops the motor after a state in which the manual driving force is less than or equal to the first threshold value continues for the predetermined time, the time that elapses before the motor stops is always the same regardless of whether the rider is pedaling slowly or quickly. Thus, if the rider stops pedaling, a higher crank rotation speed will result in the bicycle traveling a longer distance before the motor stops. It is an object of the present invention to provide a bicycle controller and a bicycle controlling method that reduce the distance the bicycle travels before the motor is stopped regardless of whether pedaling is stopped in a state where the rotation speed of the crank is high.

In accordance with a first aspect of the invention, a bicycle controller includes an electronic control unit that controls a motor, which assists pedaling of a bicycle, based on a manual driving force and angle information related to an angle of a crank of the bicycle. The electronic control unit is configured to stop the motor upon determining the crank is rotated by a predetermined angle or greater in a state where the manual driving force is less than or equal to a predetermined threshold value while the motor is driven.

With the bicycle controller according to the first aspect, the electronic control unit stops the motor if the crank is rotated by the predetermined angle or greater in a state where the manual driving force is less than or equal to the predetermined threshold value while the motor is driven. Thus, the time from when the manual driving force becomes less than or equal to the predetermined threshold value until the motor is stopped is shortened as the rotation speed of the crank is increased. This reduces the distance the bicycle travels before the motor is stopped regardless of whether pedaling is stopped in a state where the rotation speed of the crank is high.

In accordance with a second aspect of the invention, the bicycle controller according to the first aspect is configured so that the crank includes a crank arm, and the angle information includes information related to an angular position of the crank arm. With the bicycle controller according to the second aspect, since the angle information includes information related to the angular position of the crank arm, the electronic control unit can control the motor based on a comparison between the angular position of the crank arm and the predetermined angle.

In accordance with a third aspect of the invention, the bicycle controller according to the second aspects is configured so that the electronic control unit is configured to change the predetermined angle in accordance with the angular position of the crank arm at which the manual driving force becomes less than or equal to the predetermined threshold value.

With the bicycle controller according to the third aspect, since the electronic control unit changes the predetermined angle in accordance with the angular position of the crank arm at which the manual driving force becomes less than or equal to the predetermined threshold value, the motor can be appropriately stopped based on the rotation state of the crank.

In accordance with a fourth aspect of the invention, the bicycle controller according to the third aspect is configured so that the electronic control unit is configured to the predetermined angle is smaller in a state where the manual driving force becomes less than or equal to the predetermined threshold value under a condition in which the crank arm is located in a third range including a rotational position where the crank arm is separated from the top dead center by 90° or a fourth range including a rotational position where the crank arm is separated from the bottom dead center by 90° as compared to a state in which the manual driving force becomes less than or equal to the predetermined threshold value under a condition in which the crank arm is located in a first range including a top dead center or a second range including a bottom dead center.

With the bicycle controller according to the fourth aspect, when the rider is riding the bicycle in a normal state, the manual driving force is maximal in a state where the angular position of the crank arm is separated from the top or bottom dead center by 90°. Thus, in a case that the manual driving force becomes less than or equal to the predetermined threshold value with the angular position of the crank arm located at the position separated from the top or bottom dead center by 90°, it is assumed that the rider intentionally reduces the manual driving force. Therefore, it is preferred that the motor be stopped more quickly. The bicycle controller according to the fourth aspect stops the motor more quickly in the third range, which includes the rotation position where the crank arm is separated from the top dead center by 90°, and the fourth range, which includes the rotation position where the crank arm is separated from the bottom dead center by 90°.

(5) In accordance with a fifth aspect of the invention, the bicycle controller according to the third or fourth aspects is configured so that the electronic control unit is configured to decrease the predetermined angle as the angular position of the crank arm at which the manual driving force becomes less than or equal to the predetermined threshold value becomes farther from a top or bottom dead center, and the electronic control unit is configured to increase the predetermined angle as the angular position of the crank arm at which the manual driving force becomes less than or equal to the predetermined threshold value becomes closer to the top or bottom dead center.

With the bicycle controller according to the fifth aspect, the predetermined angle is decreased as the angular position of the crank arm at which the manual driving force becomes less than or equal to the predetermined threshold value becomes farther from the top or bottom dead center. Also, the predetermined angle is increased as the angular position of the crank arm becomes closer to the top or bottom dead center. This limits situations in which the motor is stopped even though the assist of the motor is needed in a state where the crank arm is located in the top or bottom dead center.

In accordance with a sixth aspect of the invention, the bicycle controller according to the fifth aspect is configured so that the electronic control unit is configured to decrease the predetermined angle in a stepped manner as the angular position of the crank arm at which the manual driving force becomes less than or equal to the predetermined threshold value becomes farther from the top or bottom dead center, and the electronic control unit is configured to increase the predetermined angle in a stepped manner as the angular position of the crank arm at which the manual driving force becomes less than or equal to the predetermined threshold value becomes closer to the top or bottom dead center.

With the bicycle controller according to the sixth aspect, the predetermined angle is decreased in a stepped manner as the angular position of the crank arm at which the manual driving force becomes less than or equal to the predetermined threshold value becomes farther from the top or bottom dead center. Also, the predetermined angle is increased in a stepped manner as the angular position of the crank arm becomes closer to the top or bottom dead center. This reduces the amount of information needed for controlling.

In accordance with a seventh aspect of the invention, the bicycle controller according to any one of the second to sixth aspects is configured so that the electronic control unit is configured to correct a corresponding relationship between the angular position of the crank arm, relative to a frame of the bicycle, and a top or bottom dead center of the crank arm based on an inclination angle of the bicycle.

With the bicycle controller according to the seventh aspect, the top and bottom dead centers of the crank have angular positions relative to the frame that differ between in a case that the bicycle travels on a level road and in a case that the bicycle travels on an uphill or a downhill. The bicycle controller according to the seventh aspect corrects the corresponding relationship between the angular position of the crank arm, relative to the frame, and the top or bottom dead center of the crank arm based on the inclination angle of the bicycle. Thus, the motor can be appropriately stopped based on a comparison between the angular position of the crank arm and the predetermined angle.

In accordance with an eighth aspect of the invention, the bicycle controller according to the seventh aspect further includes an inclination detector that detects the inclination angle of the bicycle. With the bicycle controller according to the eighth aspect, since the bicycle controller includes the inclination detector, which detects the inclination angle of the bicycle, the inclination angle can be accurately obtained.

In accordance with a ninth aspect of the invention, the bicycle controller according to any one of the preceding aspects is configured so that the electronic control unit is configured to change the predetermined angle in accordance with a rotation speed of the crank. With the bicycle controller according to the ninth aspect, since the predetermined angle is changed in accordance with the rotation speed of the crank, the timing for stopping the motor can be changed in accordance with the riding state of the bicycle.

In accordance with a tenth aspect of the invention, the bicycle controller according to the ninth aspect is configured so that the electronic control unit is configured to decrease the predetermined angle as the rotation speed of the crank increases. With the bicycle controller according to the tenth aspect, since the predetermined angle is decreased as the rotation speed of the crank increases, the assist can be further quickly stopped when pedaling is stopped in a state in which the rotation speed of the crank is high.

In accordance with an eleventh aspect of the invention, the bicycle controller according to any one of the preceding aspects is configured so that in a state where the manual driving force is decreasing, the electronic control unit is configured to change a response speed of the motor with respect to a change in the manual driving force in accordance with a deceleration rate of the crank.

With the bicycle controller according to the eleventh aspect, in a state where the manual driving force is decreasing, the response speed of the motor is changed with respect to the change in the manual driving force in accordance with the deceleration rate of the crank. Thus, assist force can be changed in accordance with the deceleration rate of the crank.

In accordance with a twelfth aspect of the invention, the bicycle controller according to the eleventh aspect is configured so that the electronic control unit is configured to increase the response speed of the motor with respect to a change in the manual driving force as the deceleration rate of the crank increases. With the bicycle controller according to the twelfth aspect, since the electronic control unit increases the response speed of the motor with respect to a change in the manual driving force as the deceleration rate of the crank increases, in a state the manual driving force is decreased to the predetermined threshold value or less, assist force can be reduced before the crank is rotated by the predetermined angle or greater. This reduces the change in assist force when the assist force is switched from an application state to a non-application state.

In accordance with a thirteenth aspect of the invention, the bicycle controller according to any one of the preceding aspects is configured so that the electronic control unit is configured to stop the motor in a state where a rotation speed of the crank is less than or equal to a predetermined speed. With the bicycle controller according to the thirteenth aspect, since the motor is stopped in a state where the rotation speed of the crank is less than or equal to a predetermined speed, the motor can be quickly stopped even if rotation of the crank is stopped at less than the predetermined angle in a state where the manual driving force becomes less than or equal to the predetermined threshold value.

In accordance with a fourteenth aspect of the invention, the bicycle controller according to any one of the ninth to thirteenth aspects further includes a speed detector that detects a rotation speed of the crank. With the bicycle controller according to the fourteenth aspect, since the bicycle controller includes the speed detector, which detects the rotation speed of the crank, the rotation speed of the crank can be accurately obtained.

In accordance with a fifteenth aspect of the invention, the bicycle controller according to any one of the preceding aspects further includes a crank sensor that outputs the angle information. With the bicycle controller according to the fifteenth aspect, since the bicycle controller includes the crank sensor, the angle information, which is related to the angle of the crank, can be accurately obtained.

In accordance with a sixteenth aspect of the invention, a bicycle controlling method controls a motor, which assists pedaling of a bicycle, based on a manual driving force and angle information related to an angle of a crank of the bicycle. The bicycle controlling method includes stopping the motor if the crank is rotated by a predetermined angle or greater in a state where the manual driving force is less than or equal to a predetermined threshold value while the motor is driven.

With the bicycle controller according to the sixteenth aspect, the motor is stopped if the crank is rotated by the predetermined angle or greater in a state where the manual driving force is less than or equal to the predetermined threshold value while the motor is driven. This shortens the time from when the manual driving force becomes less than or equal to the predetermined threshold value until the motor is stopped as the rotation speed of the crank is increased. Thus, the distance the bicycle travels before the motor is stopped is reduced regardless of whether pedaling is stopped in a state where the rotation speed of the crank is high.

Accordingly, the bicycle controller and the bicycle controlling method reduce the distance the bicycle travels before the motor is stopped regardless of whether pedaling is stopped in a state where the rotation speed of the crank is high.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field front this disclosure that the following descriptions of the embodiments are provided for illustration only and not for the purpose of limiting the invention as defined by the appended claims and their equivalents.

Figure 1:
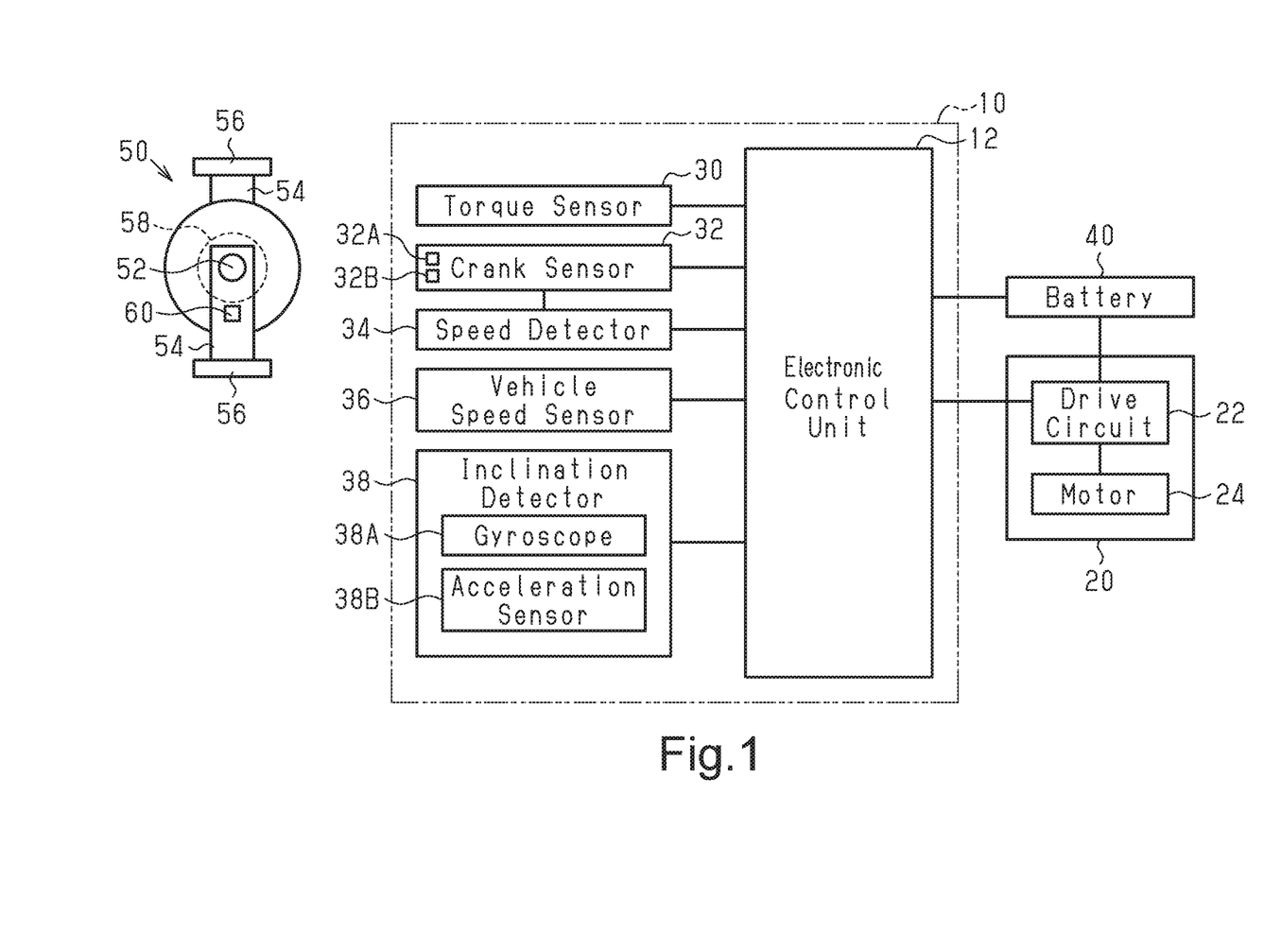
FIG. 1 is a block diagram in accordance with an electric configuration of a bicycle that includes a bicycle controller in accordance with a first embodiment.

A first embodiment of a bicycle controller 10 will now be described with reference to FIGS. 1 to 6. As shown in FIG. 1, a bicycle controller 10 includes an electronic control unit 12. The bicycle controller 10 is installed to a bicycle (not shown). The bicycle includes a drive unit 20, a torque sensor 30, a crank sensor 32, a speed detector 34, a vehicle speed sensor 36, an inclination detector 38, a battery 40 and a crank 50. The crank 50 includes a pair of crank arms 54. Preferably, the crank 50 further includes a crank axle 52 and a pair of pedals 56.

A drive circuit 22 of the drive unit 20, the torque sensor 30, the crank sensor 32, the speed detector 34, the vehicle speed sensor 36 and the inclination detector 38 are connected to the electronic control unit 12 so as to perform wired or wireless communication with the electronic control unit 12. The battery 40 is electrically connected to the electronic control unit 12 and the drive circuit 22. The battery 40 is mounted, for example, on a frame of the bicycle. The frame of the bicycle can include at least one of a rear carrier and a front carrier. In a case that the torque sensor 30, the crank sensor 32, the speed detector 34, the vehicle speed sensor 36 and the inclination detector 38 are connected to the electronic control unit 12 by wires, the electronic control unit 12 can supply power to the components. Alternatively, the battery 40 can directly supply power to the components. In a case that the torque sensor 30, the crank sensor 32, the speed detector 34, the vehicle speed sensor 36 and the inclination detector 38 are connected to the electronic control unit 12 through wireless communication, the torque sensor 30, the crank sensor 32, the speed detector 34, the vehicle speed sensor 36 and the inclination detector 38 each include a power supply. Examples of the power supply include a rechargeable battery and a power generator.

The drive unit 20 includes a motor 24, which assists pedaling of the bicycle. The electronic control unit 12 controls the motor 24 based on angle information, which is related to the angle of the crank of the bicycle, and a manual driving force, which is inputted to the bicycle by the rider. The electronic control unit 12 includes an arithmetic processing unit and a memory. The arithmetic processing unit includes, for example, a central processing unit (CPU) or a micro processing unit (MPU). The arithmetic processing unit executes predetermined control programs. The memory stores information used for various kinds of control programs and control processes. The memory 34 is one or more storage devices (i.e., one or more computer memory devices). The memory includes, for example, any a non-transitory computer readable medium such as a random access memory (RAM) and a read only memory (ROM), a hard disk, a flash drive, etc. The memory can be formed separately from the electronic control unit 12. The electronic control unit 12 can be arranged in the drive unit 20 or separately from the drive unit 20. The electronic control unit 12 can include one or more arithmetic processing units and memories. For example, in a case that the electronic control unit 12 includes a plurality of arithmetic processing units and memory devices, the drive unit 20 and other components can each include an arithmetic processing unit and a memory that are similar to those included in the electronic control unit 12. The electronic control unit 12 can include general circuits such as an input interface circuit and an output interface circuit.

The drive unit 20 includes the drive circuit 22 and the motor 24. The drive circuit 22 controls power that is supplied from the battery 40 to the motor 24. The motor 24 assists pedaling of the bicycle. The motor 24 assists manual driving force inputted to the bicycle. The motor 24 includes an electric motor. The motor 24 is connected to a power transmission path that extends from the crank axle 52 to a rear sprocket of the bicycle. Preferably, the motor 24 is connected to a power transmission path that extends from the crank axle 52 to a front sprocket. The drive unit 20 can include a reduction gear that reduces the speed of rotation produced by the motor 24. The drive unit 20 can be included in a front hub or a rear hub. In this case, the motor 24 is connected to a hub shell of the front hub or the rear hub.

The bicycle controller 10 includes the torque sensor 30, the crank sensor 32, the speed detector 34 and the inclination detector 38. The torque sensor 30 outputs a signal corresponding to manual driving force. The torque sensor 30 detects manual driving force that is applied to the crank 50 or the pedals 56. The torque sensor 30 includes, for example, at least one of a strain sensor, a magnetostriction sensor, an optical sensor and a pressure sensor. The electronic control unit 12 calculates a manual driving force per unit time (hereafter referred to as "the manual driving force TH") based on the output of the torque sensor 30.

The crank sensor 32 outputs the angle information, which is related to the angle of the crank 50 of the bicycle. The angle information includes information related to the angular positions of the crank arms 54. The crank sensor 32 is coupled to the drive unit 20. The crank sensor 32 includes a first element 32A and a second element 32B. The first element 32A detects the magnetic field of a first magnet 58. The second element 32B outputs a signal corresponding to the position relationship between the second element 32B and a second magnet 60. The first magnet 58 is arranged on the crank axle 52 or one of the crank arms 54 at a position that is coaxially with the crank axle 52. The first magnet 58 is annular, and has different magnetic poles that are alternately arranged in the circumferential direction. The first element 32A outputs a signal corresponding to the rotational angle of the crank arms 54 relative to the frame. During a single rotation of the crank arms 54, the first element 32A outputs a signal in which a single cycle corresponds to an angle obtained by dividing 360° by the number of magnetic poles having the same polarity. The minimum value of the angular position of the crank arm 54 that is detectable by the crank sensor 32 is less than or equal to 180°. The minimum value is preferably 15° and more preferably 6°. The second magnet 60 is arranged on the crank axle 52 or one of the crank arms 54. The second element 32B detects a reference position of the crank arms 54 relative to the frame (e.g., top dead center or bottom dead center of crank arms 54). The second element 32B outputs a signal in a single cycle corresponds to a single rotation of the crank arms 54. The electronic control unit 12 defines the angular position of the crank arm 54 relative to the frame based on the signals from the first element 32A and the second element 32B. The first element 32A includes a magnetic reed forming a reed switch or a Hall element. The second element 32B includes a magnetic reed or a Hall element.

The crank sensor 32 can include a third element that detects the intensity of the magnetic field instead of the first element 32A and the second element 32B. Also, an annular magnet, the magnetic field of which changes in intensity in the circumferential direction, is arranged on the crank axle 52 or the crank arms 54. The third element outputs a signal corresponding to the intensity of the magnetic field of the magnet. The electronic control unit 12 can define the angular position of the crank arm 54 relative to the frame based on the output of the third element. In this case, the memory of the electronic control unit 12 stores the signal that is output from the third element at the reference position of the crank arms 54 relative to the frame. The third element includes a Hall element or a magneto resistive (MR) sensor.

The speed detector 34 can be arranged in the drive unit 20 or separately from the drive unit 20. The speed detector 34 detects the rotation speed of the crank 50 (hereafter referred to as "the rotation speed VC of the crank 50") based on the output of the crank sensor 32. The speed detector 34 can be included in the electronic control unit 12. The speed detector 34 detects the rotation speed VC of the crank 50 based on the output of the crank sensor 32. The speed detector 34 detects the rotation speed VC of the crank 50 based on a signal that is output from at least one of the first element 32A and the second element 32B or a signal output from the third element.

The vehicle speed sensor 36 is coupled to a chainstay of the bicycle. The vehicle speed sensor 36 transmits a value to the electronic control unit 12 in correspondence with a change in position relative to a magnet attached to a spoke of the rear wheel. Preferably, the vehicle speed sensor 36 includes a magnetic reed forming a reed switch or a Hall element. The electronic control unit 12 calculates a travel distance per unit time (hereafter referred to as "the vehicle speed VS") based on the output of the vehicle speed sensor 36 and the circumferential length of the rear wheel, which is stored in the memory in advance. The vehicle speed sensor 36 can be coupled to a front fork. In this case, the magnet is attached to a spoke of the front wheel. The vehicle speed sensor 36 can include a global positioning system (GPS) receiver. In a case that the vehicle speed sensor 36 includes a GPS receiver, the vehicle speed VS is calculated based on position data, which is received by the GPS receiver, and map data, which is stored in the memory.

The inclination detector 38 is coupled to the frame of the bicycle. The inclination detector 38 detects the inclination angle of the bicycle. The inclination detector 38 includes a three-axis gyroscope 38A and a three-axis acceleration sensor 38B. An output of the inclination detector 38 includes information of the position angle with respect to each of the three axes and the acceleration rate with respect to each of the three axes. The position angles with respect to the three axes are a pitch angle DA, a roll angle DB, and a yaw angle DC. Preferably, the three axes of the gyroscope 38A conform to the three axes of the acceleration sensor 38B. Preferably, the inclination detector 38 is coupled to the bicycle so that the direction in which the axis of the pitch angle DA extends substantially conforms to the sideward direction of the bicycle. The inclination detector 38 can be coupled to the front fork, a handlebar, or the drive unit 20. The inclination detector 38 can include a one-axis acceleration sensor.

The electronic control unit 12 obtains information related to the inclination angle of the bicycle from the inclination detector 38, which detects the inclination angle of the bicycle in the front-rear direction. The electronic control unit 12 calculates, for example, an inclination angle D of the bicycle based on the output of the inclination detector 38.

The inclination angle D is the angle of the bicycle inclined in the front-rear direction of the bicycle about the axis extending in the sideward direction of the bicycle. More specifically, the inclination angle D is the pitch angle DA. The inclination angle D is set to be 0° in a state where the bicycle is placed at a horizontal position. Thus, the inclination angle D is correlated with the gradient of a road surface on which the bicycle travels.

The electronic control unit 12 controls the motor 24 based on the manual driving force TH and the vehicle speed VS. The electronic control unit 12 calculates riding assist force PX, which is X times the manual driving force TH where X is a real number, as base riding assist force PA. The electronic control unit 12 controls the motor 24 so that the torque applied to the power transmission path from the drive unit 20 is X times the torque applied to the power transmission path by the manual driving force TH.

The electronic control unit 12 executes a first assist stopping process, a second assist stopping process and a third assist stopping process. The electronic control unit 12 executes each assist stopping process in a predetermined cycle while the motor 24 is driven. The assist stopping processes can be executed in the same timing or different timings.

In the first assist stopping process, the electronic control unit 12 stops the assisting motor 24 based on the vehicle speed VS. In the second assist stopping process, the electronic control unit 12 stops the assisting motor 24 based on the rotation speed VC of the crank 50. In the third assist stopping process, the electronic control unit 12 stops the assisting motor 24 based on the manual driving force TH and the angular position of the crank 50.

The procedures of the first assist stopping process will now be described. In the description hereafter, components of the bicycle having reference characters indicate the corresponding components of the bicycle shown in FIG. 1.

Figure 2:
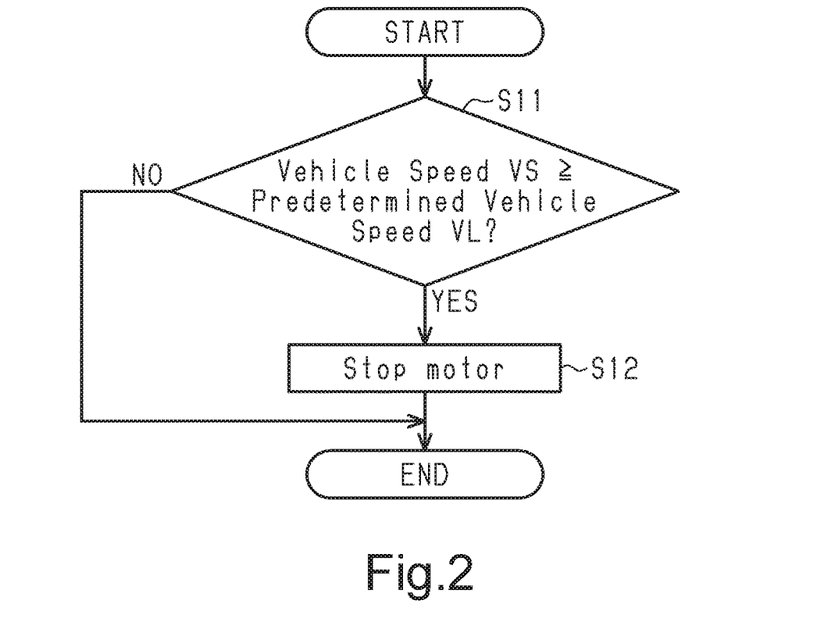
FIG. 2 is a flowchart in accordance with a first assist stopping process executed by an electronic control unit shown in FIG. 1.

In step S11, the electronic control unit 12 determines whether or not the vehicle speed VS is greater than or equal to a predetermined vehicle speed VL. The predetermined vehicle speed VL is, for example, 25 km per hour. If the electronic control unit 12 determines that the vehicle speed VS is greater than or equal to the predetermined vehicle speed VL, then the electronic control unit 12 proceeds to step S12 and stops the motor 24. If the electronic control unit 12 determines that the vehicle speed VS is less than the predetermined vehicle speed VL, then the electronic control unit 12 temporarily ends the process.

Figure 3:
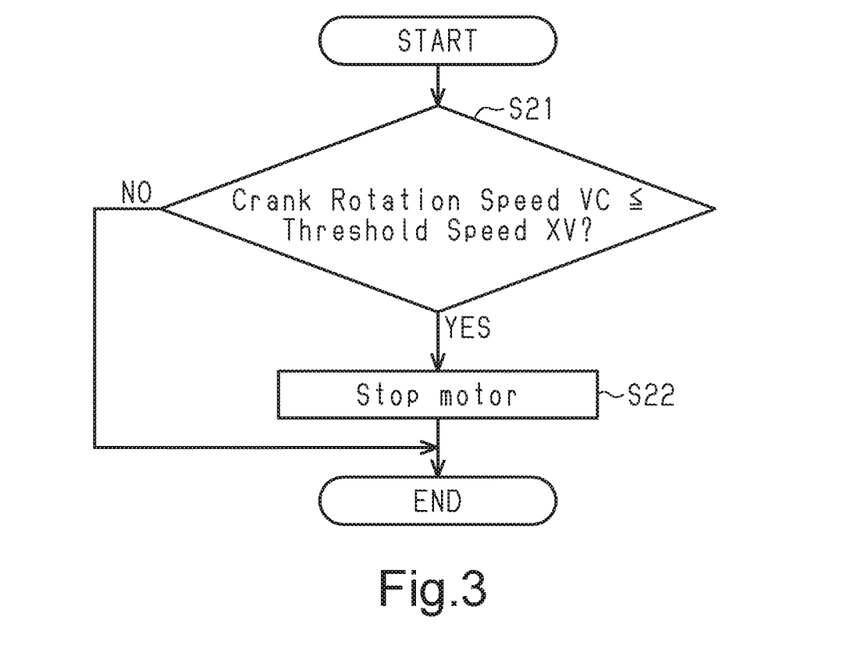
FIG. 3 is a flowchart in accordance with a second assist stopping process executed by the electronic control unit.

The operation and procedures of the second assist stopping process will now be described with reference to FIG. 3. In a state where the rotation speed VC of the crank 50 is less than or equal to a predetermined speed XV, the electronic control unit 12 is configured to stop the motor 24. More specifically, in step S21, the electronic control unit 12 determines whether or not the rotation speed VC of the crank 50 is less than or equal to the predetermined speed XV. The predetermined speed XV is, for example, 10 rpm or 5 rpm. If the electronic control unit 12 determines that the rotation speed VC of the crank 50 is less than or equal to the predetermined speed XV, the electronic control unit 12 proceeds to step S22 and stops the motor 24. If the electronic control unit 12 determines that the rotation speed VC of the crank 50 is greater than the predetermined speed XV, then the electronic control unit 12 temporarily ends the process.

The third assist stopping process will now be described with reference to FIGS. 4 to 6. The third assist stopping process is a bicycle controlling method that stops the motor 24 if the crank 50 is rotated by a predetermined angle XA or greater in a state where the manual driving force TH is less than or equal to a predetermined threshold value XT while the motor 24 is driven.

In other words, in a state where the manual driving force TH is less than or equal to the predetermined threshold value XT while the motor 24 is driven, if the crank 50 is rotated by the predetermined angle XA or greater, then the electronic control unit 12 stops the motor 24. More specifically, in a state where the manual driving force TH is less than or equal to the predetermined threshold value XT while the motor 24 is driven, if the electronic control unit 12 determines that the crank 50 has been rotated by the predetermined angle XA or greater based on angle information related to the angle of the crank 50, then the electronic control unit 12 stops the motor 24. In other words, the electronic control unit 12 is configured to stop the motor 24 upon determining the crank 50 is rotated by the predetermined angle XA or greater in a state where the manual driving force TH is less than or equal to the predetermined threshold value XT while the motor is driven. The electronic control unit 12 is configured to change the predetermined angle XA in accordance with the angular position of the crank arm 54 at which the manual driving force TH becomes less than or equal to the predetermined threshold value XT. Although it is preferred that the threshold value XT be 0 Nm, the threshold value XT is set to a range, for example, from 3 to 5 Nm taking into consideration variations in the output of the torque sensor 30.

The electronic control unit 12 has information showing the relationship between the predetermined angle XA and the angular position of the crank arm 54 at which the manual driving force TH becomes less than or equal to the predetermined threshold value XT. Since the phases of the right and left crank arms 54 differ from each other by 180°, the electronic control unit 12 only needs to have information showing the relationship between the predetermined angle XA and the angular position of one of the right and left crank arms 54. The information can be stored in the memory as a map such as that shown in FIG. 4 or a function. The electronic control unit 12 is configured to change the predetermined angle XA to be smaller in a state where the manual driving force TH becomes less than or equal to the predetermined threshold value XT under a condition in which the crank arms 54 are located in a third range R3, which includes a position rotated from the top dead center by 90°, and a fourth range R4, which includes a position rotated from the bottom dead center by 90° as compared to a state in which the manual driving force TH becomes less than or equal to the predetermined threshold value XT under a condition in which the crank arms 54 are located in a first range R1, which includes the top dead center, and a second range R2, which includes the bottom dead center. The electronic control unit 12 is configured to decrease the predetermined angle XA as the angular position of each crank arm 54 at which the manual driving force TH becomes less than or equal to the predetermined threshold value XT becomes father from the top or bottom dead center. The electronic control unit 12 is configured to increase the predetermined angle XA as the angular position of the crank arm 54 becomes closer to the top or bottom dead center.

The top dead center is the angular position of each crank arm 54 where the distal end of the crank arm 54 is located at the highest position in the vertical direction. The bottom dead center is the angular position of the crank arm 54 where the distal end of the crank arm 54 is located at the lowest position in the vertical direction. The first range R1 is a range, for example, from the top dead center to 10° in a first rotation direction of the crank arms 54 and 10° in a second rotation direction that is opposite to the first rotation direction of the crank arms 54. The second range R2 is a range, for example, from the bottom dead center to 10° in the first rotation direction of the crank arms 54 and 10° in the second rotation direction of the crank arms 54. The third range R3 is a range, for example, from the position rotated by 90° from the top dead center to 10° in the first rotation direction of the crank arms 54 and 10° in the second rotation direction of the crank arms 54. The fourth range R4 is a range, for example, from the position rotated by 90° from the bottom dead center to 10° in the first rotation direction of the crank arms 54 and 10° in the second rotation direction of the crank arms 54.

The procedures of the third assist stopping process will now be described with reference to FIG. 5. In step S31, the electronic control unit 12 determines whether or not the manual driving force TH is less than or equal to the predetermined threshold value XT. If the electronic control unit 12 determines that the manual driving force TH is greater than the predetermined threshold value XT, then the electronic control unit 12 temporarily ends the process. If the electronic control unit 12 determines that the manual driving force TH is less than or equal to the predetermined threshold value XT, then the electronic control unit 12 proceeds to step S32 and obtains the angular position of the crank arm 54. In step S33, the electronic control unit 12 sets the predetermined angle XA. The electronic control unit 12 obtains the angular position of the crank arm 54, for example, at the point of time when the manual driving force TH is determined to be less than or equal to the predetermined threshold value XT. Then, the electronic control unit 12 uses the map shown in FIG. 4 to set the predetermined angle XA corresponding to the angular position of the crank arm 54 obtained in step S32.

In step S34, the electronic control unit 12 calculates the angle rotated from the angular position of the crank arm 54. In step S35, the electronic control unit 12 determines whether or not the rotated angle of the crank arms 54 is greater than or equal to the predetermined angle XA. If the electronic control unit 12 determines that the rotated angle of the crank arms 54 is greater than or equal to the predetermined angle XA, then the electronic control unit 12 proceeds to step S36 and stops the motor 24.

If the electronic control unit 12 determines that the rotated angle of the crank arms 54 is less than the predetermined angle XA, then the electronic control unit 12 proceeds to step S37 and determines whether or not the manual driving force TH is less than or equal to the predetermined threshold value XT. If the manual driving force TH is less than or equal to the predetermined threshold value XT, then the electronic control unit 12 again proceeds to step S34 to calculate the rotated angle of the crank arms 54. If the manual driving force TH is greater than the predetermined threshold value XT, then the electronic control unit 12 temporarily ends the process. In a case that the motor 24 is stopped in the first or second assist stopping process, the electronic control unit 12 temporarily ends the third assist stopping process.

Figure 6:
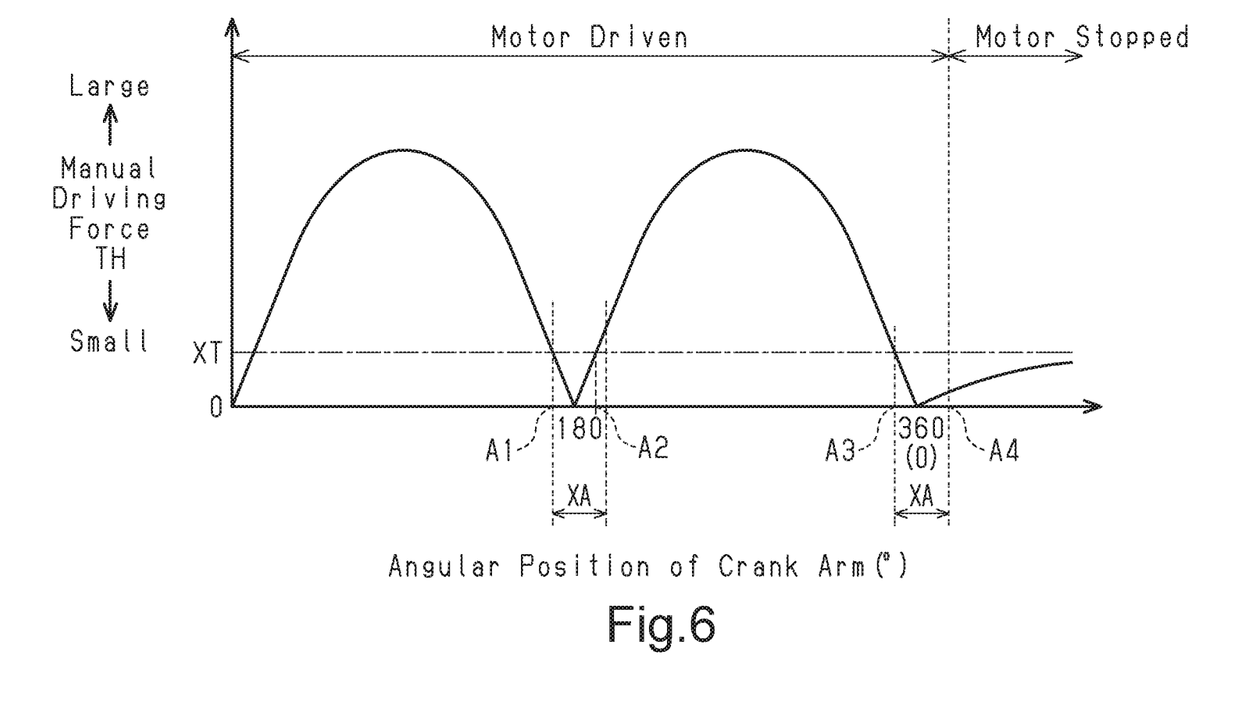
FIG. 6 is a graph showing the relationship between the manual driving force and the angular position of the crank arm.

FIG. 6 is a graph showing one example of the relationship between the manual driving force TH and the angular position of the crank arm 54 when executing the third assist stopping process. In a case that the crank arms 54 are rotated from the top or bottom dead center in the first rotation direction to move the bicycle, the manual driving force TH increases as one of the crank arms 54 is rotated from the angular position of 0°. When the angular position of the crank arm 54 exceeds 90°, the manual driving force TH starts decreasing. At the angular position A1 of the crank arm 54, the manual driving force TH becomes less than or equal to the predetermined threshold value XT. At this point, the electronic control unit 12 sets the predetermined angle XA corresponding to the angular position A1 of the crank arm 54 using the map shown in FIG. 4.

When the angular position of the crank arm 54 exceeds 180°, the manual driving force TH starts increasing. At an angular position A2 of the crank arm 54, the manual driving force TH exceeds the predetermined threshold value XT. At this point, the electronic control unit 12 calculates the rotated angle between the angular position A1 and the angular position A2 of the crank arm 54 and determines whether or not the rotated angle is greater than or equal to the predetermined angle XA. Here, the rotated angle is less than the predetermined angle XA. Thus, the motor 24 continues to be driven.

When the angular position of the crank arm 54 exceeds 270°, the manual driving force TH starts decreasing. At an angular position A3 of the crank arm 54, the manual driving force TH becomes less than or equal to the predetermined threshold value XT. At this point, the electronic control unit 12 sets the predetermined angle XA corresponding to the angular position A3 of the crank arm 54 using the map shown in FIG. 4. The angular position A3 of the crank arm 54 relative to the top and bottom dead center conforms to the angular position A1 of the crank arm 54 relative to the top and bottom dead centers. Thus, the angle XA is set to be the same as the predetermined angle XA set for the angular position A1 of the crank arm 54.

When the angular position of the crank arm 54 exceeds 360°(0°), the manual driving force TH starts increasing. However, the increase rate is small. At an angular position A4 that is obtained by adding the predetermined angle XA to the angular position A3 of the crank arm 54, the manual driving force TH is also less than or equal to the predetermined threshold valve XT. More specifically, in a state where the manual driving force TH is less than or equal to the predetermined threshold value XT, the rotated angle of the crank arm 54 is greater than or equal to the predetermined angle XA. At this point, the electronic control unit 12 stops the motor 24.

Although not shown in FIG. 6, when the rider starts pedaling to move the bicycle, the bicycle may be advanced relative to the pedaling of the rider. Thus, the manual driving force TH is less than or equal to the predetermined threshold value XT. In this case, if the electronic control unit 12 determines that the crank arms 54 are rotated by the predetermined angle XA or greater in a state where the manual driving force TH is less than or equal to the predetermined threshold value XT, then the electronic control unit 12 stops the motor 24. This limits sudden movement of the bicycle.

Additionally, in a case that the feet of the rider are not on the pedals 56, the crank arms 54 may be rotated by the motor 24 in a state where the feet are not on the pedals 56. Since the feet are not on the pedals 56, the crank arms 54 are rotated in a state where the manual driving force TH is less than or equal to the predetermined threshold value XT. Thus, if the electronic control unit 12 determines that the crank arms 54 have been rotated by the predetermined angle XA or greater, then the control unit 12 stops the motor 24. This limits continuation of the assist control in a case that the feet of the rider are not on the pedals 56.

Second Embodiment

Figure 7:
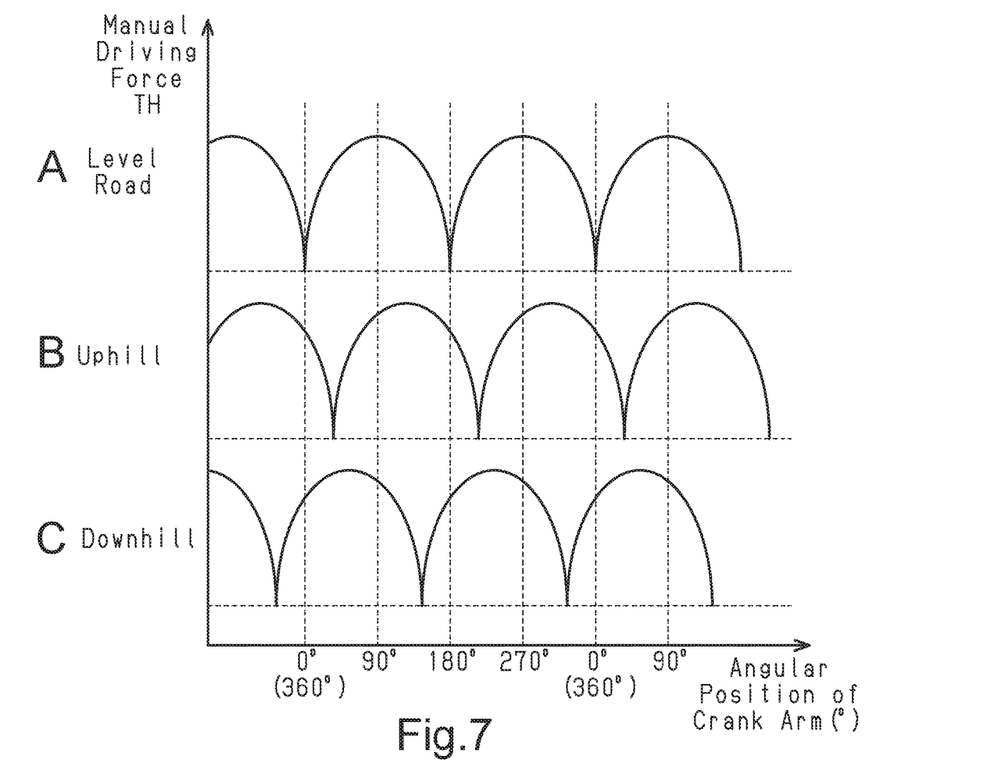
FIG. 7 is a series of graphs in accordance with the relationship between the manual driving force and the angular position of the crank arm corresponding to the inclination angles in a bicycle controller in accordance with a second embodiment.
Figure 8:
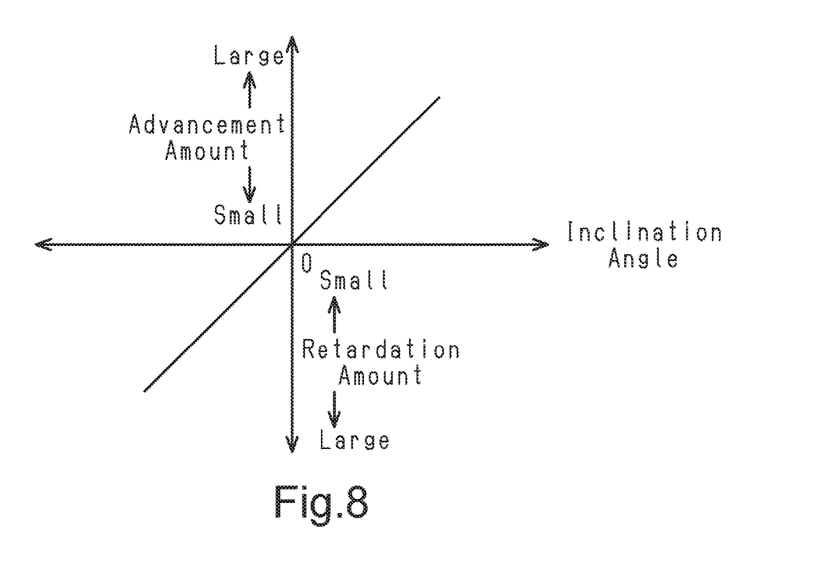
FIG. 8 is a map in accordance with the inclination angle associated with an advancement amount and a retardation amount.

A second embodiment of the bicycle controller 10 will now be described with reference to FIGS. 7 and 8. When the rider is riding the bicycle on a level road with the inclination angle D of 0°, the manual driving force TH is minimal at the top and bottom dead centers and maximal at positions separated from the top and bottom dead centers by 90°.

When the rider is riding the bicycle on an uphill where the inclination angle D is greater than 0°, the manual driving force TEL is minimal at a timing after each of the top and bottom dead centers of the level road, that is, when the angular position of the crank arm 54 is 0°+|RX|° and 180°+|RX|°. Here, RX is the angular difference in angle between the top or bottom dead center of the level road and the angular position of the crank arm 54 at which the manual driving force TH is minimal.

When the rider is riding the bicycle on a downhill where the inclination angle D is less than 0°, the manual driving force TH is minimal at a timing before each of the top and the bottom dead centers of the level road, that is, when the angular position of the crank arm 54 is 0−|RX|° and 180°−|RX|°.

The angular difference RX is substantially equal to the inclination angle D. When the inclination angle D is greater than 0°, the angular difference RX has a positive value. When the inclination angle D is less than 0°, the angular difference RX has a negative value. More specifically, in a state where the crank arms 54 extend orthogonal to the road surface of an uphill and a downhill, the manual driving force TH is minimal.

As described above, the angular position of the crank arm 54 at which the manual driving force TH is minimal differs depending on the inclination angle D. Thus, the electronic control unit 12 is configured to correct the corresponding relationship between the angular position of the crank arm 54 relative to the frame of the bicycle and the top or bottom dead center of the crank arm 54 based on the inclination angle D of the bicycle. The electronic control unit 12 includes information showing the relationship between the inclination angle D of the bicycle and the angular difference RX. The information can be stored in the memory as a map such as that shown in FIG. 8 or a function. As shown in the map, at the inclination angle D of greater than 0°, which indicates an uphill gradient, the electronic control unit 12 advances the reference angular position of the crank arm 54 from the inclination angle D of 0°. At the inclination angle D of less than 0°, which indicates a downhill, the electronic control unit 12 retards the reference angular position of the crank arm 54 from the inclination angle D of 0°. In a range where the inclination angle D is greater than 0°, the advancement amount is increased as the inclination angle D increases. In a range where the inclination angle D is less than 0°, the retardation amount is increased as the inclination angle D decreases.

In the third assist stopping process, the electronic control unit 12 corrects the angular position of the crank arm 54 at which the manual driving force TH becomes less than or equal to the predetermined threshold valve XT based on the inclination angle D of the bicycle. When the inclination angle D is greater than 0°, the electronic control unit 12 sets a value advanced from the angular position of the crank arm 54, which is obtained from the crank sensor 32, by the angular difference RX corresponding to the inclination angle D to the angular position of the crank arm 54 at which the manual driving force TH becomes less than or equal to the predetermined threshold valve XT. When the inclination angle D is less than 0°, the electronic control unit 12 sets a value retarded from the angular position of the crank arm 54, which is obtained from the crank sensor 32, by the angular difference RX corresponding to the inclination angle D to the angular position of the crank arm 54 at which the manual driving force TH becomes less than or equal to the predetermined threshold valve XT. The electronic control unit 12 calculates the predetermined angle XA from the map shown in FIG. 4 based on the angular position of the crank arm 54, which has been corrected based on the inclination angle D.

Third Embodiment

A third embodiment of the bicycle controller 10 will now be described with reference to FIGS. 9 to 12. In a state where the manual driving force TH is decreased, the electronic control unit 12 controls the riding assist force PX so that a decrease in the riding assist force PX retards with respect to the decrease in the manual driving force TH. In other words, the electronic control unit 12 reduces the response speed of the riding assist force PX with respect to a change in the decrease of the manual driving force TH. The electronic control unit 12 basically controls the motor 24 so that the base riding assist force PA, which is set in accordance with the manual driving force TH, is output as the riding assist force PX. In a state where the manual driving force TH is decreased, the electronic control unit 12 corrects the base riding assist force PA and controls the motor 24 so that the corrected base riding assist force PA is output as the riding assist force PX. The corrected base riding assist force PA is greater than or equal to the uncorrected base riding assist force PA. The electronic control unit 12 performs this correction process using, for example, a low-pass filter or a moving average filter. The base riding assist force PA and the riding assist force PX, which are set in accordance with the manual driving force TH, and changes in the base riding assist force PA and the riding assist force PX with respect to time will now be described.

Figure 9:
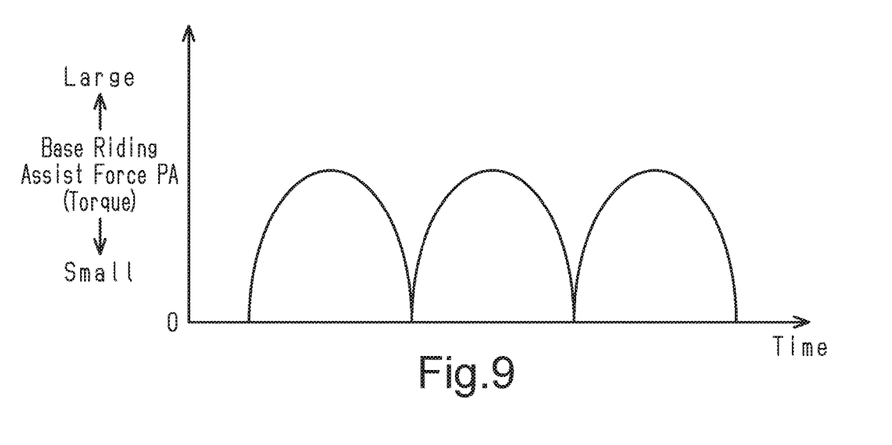
FIG. 9 is a graph in accordance with the relationship between the basic riding assist force and time in a bicycle controller in accordance with a third embodiment.

As shown in FIG. 9, the base riding assist force PA, which is X times the manual driving force TH, is minimal when the crank arms 54 are located at the top dead center and bottom dead center, and maximal when the crank arms 54 are located at positions rotated from the top dead center and bottom dead center by 90°.

The electronic control unit 12 controls the motor 24 so that the base riding assist force PA is output as the riding assist force PX. In a state where the manual driving force TH is decreased, the electronic control unit 12 corrects the base riding assist force PA and controls the motor 24 so that the corrected base riding assist force PA is output as the riding assist force PX.

Figure 10:
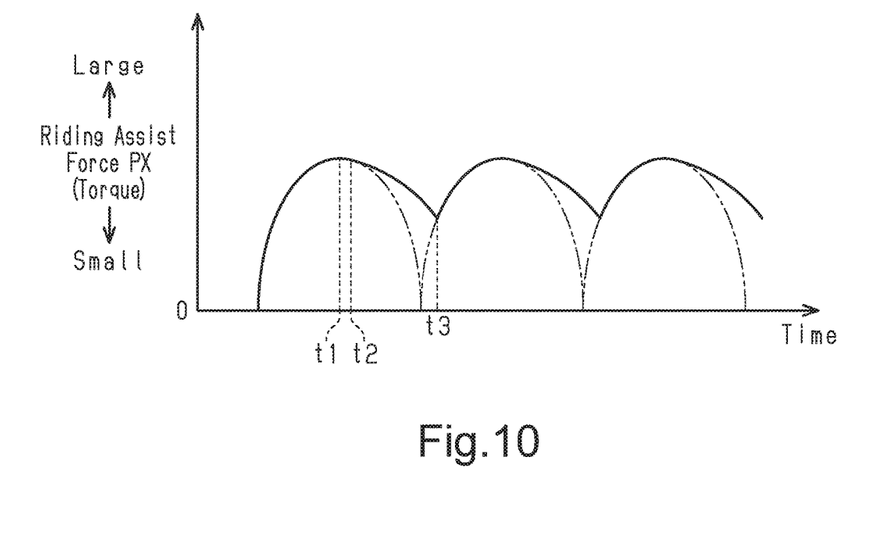
FIG. 10 is a graph in accordance with the relationship between the riding assist force and time.

As shown in FIG. 10, at time t2, which is subsequent to time t1 when the base riding assist force PA shows the maximum value, if the electronic control unit 12 determines that the manual driving force TH has been decreased, the electronic control unit 12 retards a decrease in the riding assist force PX (solid lines in FIG. 10) with respect to the decrease in the manual driving force TH. More specifically, the electronic control unit 12 corrects the base riding assist force PA using a first-order low-pass filter and sets the riding assist force PX to the corrected base riding assist force PA. In a case that the electronic control unit 12 corrects the base riding assist force PA using the first-order low-pass filter in such a manner, the decrease in the riding assist force PX is retarded with respect to the decrease in the manual driving force TH. The imaginary lines in FIG. 10 indicate the base riding assist force PA.

In a case that the electronic control unit 12 starts the process for correcting the base riding assist force PA, the electronic control unit 12 continues the correction process of the base riding assist force PA while the corrected riding assist force PX is greater than the uncorrected base riding assist force PA. More specifically, from time t2 to time t3 in FIG. 10, the electronic control unit 12 continues the correction process of the base riding assist force PA. At time t3, when the uncorrected base riding assist force PA is greater than or equal to the corrected base riding assist force PA, the electronic control unit 12 stops the correction process.

Additionally, in a state where the manual driving force TH is decreasing, the electronic control unit 12 is configured to change the response speed of the motor 24 with respect to the change in the manual driving force TH based on the deceleration rate of the crank 50. More specifically, in a state where the manual driving force TH is decreasing, the electronic control unit 12 is configured to control the retardation of the decrease in the riding assist force PX with respect to the decrease in the manual driving force TH in accordance with the deceleration rate of the crank 50.

More specifically, the electronic control unit 12 calculates the deceleration rate of the crank 50 from the output of the crank sensor 32. The speed detector 34 can calculate the deceleration rate of the crank 50 and transmit the deceleration rate to the electronic control unit 12. The electronic control unit 12 sets the time constant of the first-order low-pass filter to a time constant corresponding to the deceleration rate of the crank 50. As the time constant decreases, the response speed of the motor 24 is advanced in a state where the manual driving force TH is decreased. As the time constant increases, the response speed of the motor 24 is retarded in a state where the manual driving force TH is decreased. In a case that the deceleration rate of the crank 50 is increased, the electronic control unit 12 increases the response speed of the motor 24 with respect to the change in the manual driving force TH. The electronic control unit 12 decreases the time constant as the deceleration rate of the crank 50 is increased, and increases the time constant as the deceleration rate of the crank 50 is decreased.

Figure 11:
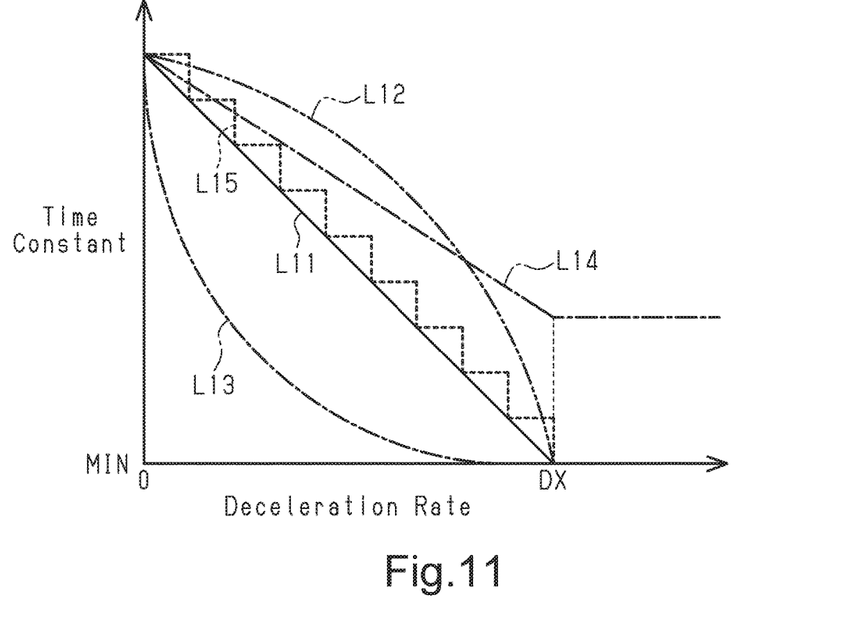
FIG. 11 is a map showing the deceleration of the crank associated with a time constant.

The electronic control unit 12 includes, for example, a time constant map shown in FIG. 11 and sets the time constant based on the time constant map. The time constant map includes information in which the time constant is associated with the deceleration rate of the crank 50. The time constant is decreased as the deceleration rate of the crank 50 increases. Additionally, in a state the deceleration rate of the crank 50 is greater than or equal to a predetermined value DX, the time constant is associated to be a minimal constant value. Instead of using the time constant map, the electronic control unit 12 can use a predetermined expression to calculate the time constant corresponding to the deceleration rate of the crank 50.

In the time constant map, the relationship between the time constant and the deceleration rate of the crank 50 can be expressed by a linear function as indicated by a line L11 of FIG. 11 or Nth-degree functions as indicated by lines L12 and L13 of FIG. 11. Alternatively, as indicated by a line L14 of FIG. 11, in a state where the deceleration rate of the crank 50 is the predetermined value DX, the time constant can have a numeral value that is greater than the minimum value. As shown in FIG. 11 with the lines L11 to L14, the time constant map can be set so that the time constant continuously changes in accordance with changes in the deceleration rate of the crank 50. Alternatively, as shown in FIG. 11 with a line L15, the time constant map can be set so that the time constant changes in a non-continuous and stepped manner in accordance with the changes in the deceleration rate of the crank 50. A time constant map such as that described above is determined through experiments or the like. The electronic control unit 12 can include a plurality of time constant maps, and the time constant maps can be selected using an operation unit of the bicycle or an external device.

Figure 12:
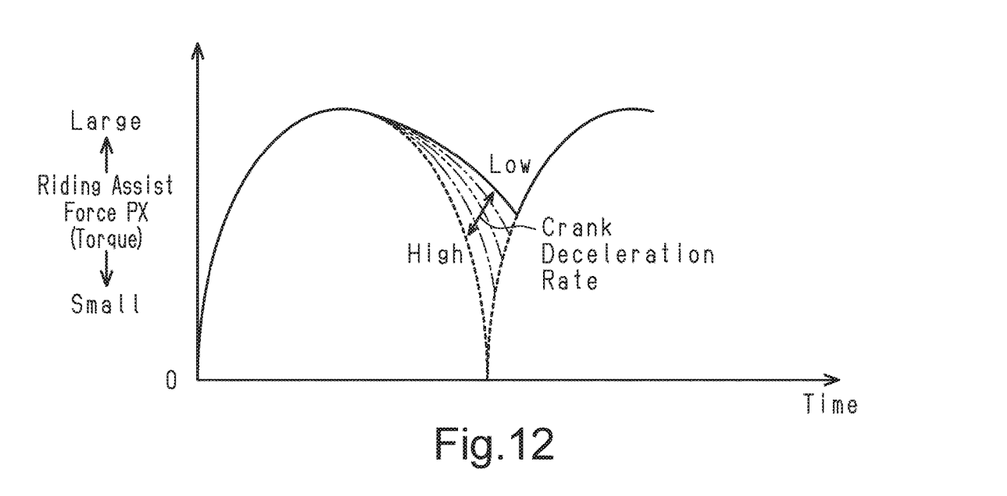
FIG. 12 is a graph in accordance with changes in the response speed of the motor and the riding assist force with respect to time.

As shown in FIG. 12, the electronic control unit 12 uses the map of FIG. 11 to decrease the time constant as the deceleration rate of the crank 50 increases. Thus, as the deceleration rate of the crank 50 increases, the riding assist force PX (solid line of FIG. 12) becomes closer to the base riding assist force PA (broken lines in FIG. 12). Hence, the riding assist force PX is quickly decreased as the deceleration rate of the crank 50 increases in a state where the manual driving force TH is decreasing. This decreases the difference in an output torque TA of the motor 24 when the assist force is switched from an application state to a non-application state. Consequently, when the rider is reducing the speed of the bicycle to stop the bicycle, the rider subtly feels a sudden decrease in the output torque TA.

Fourth Embodiment

A fourth embodiment of the bicycle controller 10 will now be described with reference to FIG. 13. The electronic control unit 12 is configured to change the predetermined angle XA in accordance with the rotation speed VC of the crank 50. In this change of the predetermined angle XA, in a case that the rotation speed VC of the crank 50 is increased, the predetermined angle XA is decreased. The electronic control unit 12 corrects the predetermined angle XA, for example, so that the predetermined angle XA is decreased as the rotation speed VC of the crank 50 is increased. In other words, the electronic control unit 12 is configured to decrease the predetermined angle XA as the rotation speed VC of the crank 50 increases. The electronic control unit 12 has a map of the correction value of the predetermined angle XA and corrects the predetermined angle XA based on the correction map.

Figure 13:
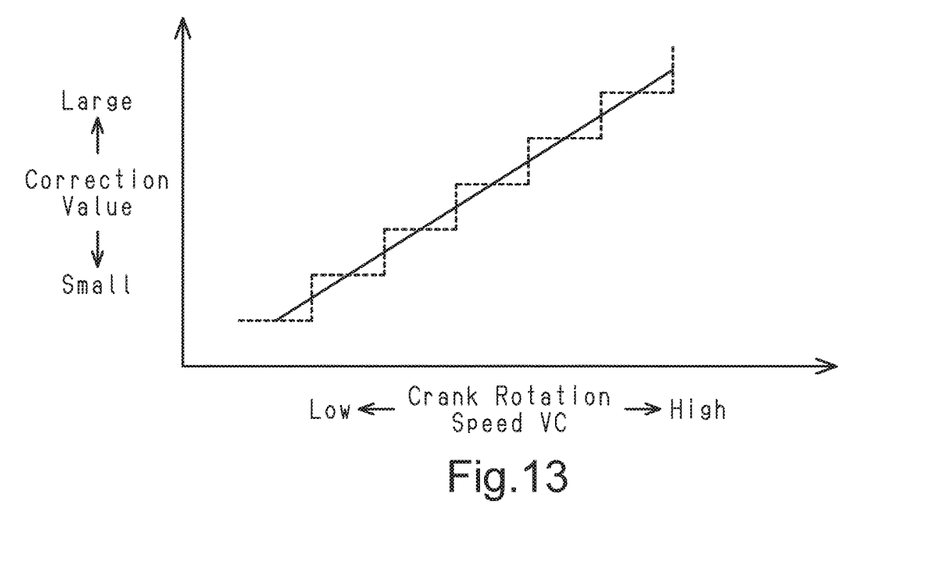
FIG. 13 is a map in accordance with the rotation speed of the crank associated with the correction value of the predetermined angle in a bicycle controller in accordance with a fourth embodiment.

FIG. 13 is a correction map that includes information in which the rotation speed VC of the crank 50 is associated with the correction value of the predetermined angle XA. As the rotation speed VC of the crank 50 is increased, the correction value is increased. Instead of using the correction value map, the electronic control unit 12 can use a predetermined expression to calculate the correction value corresponding to the rotation speed VC of the crank 50. In the correction map, the correction value can be continuously changed in accordance with the change in the rotation speed VC of the crank 50 as shown in FIG. 13 by a solid line. Alternatively, as shown in FIG. 13 by a broken line, the correction value can be changed in a non-continuous and stepped manner in accordance with the change in the rotation speed VC of the crank 50.

When setting the predetermined angle XA (step S33 of FIG. 5) in the third assist stopping process, the electronic control unit 12 uses the correction map of FIG. 13 to correct the predetermined angle XA. More specifically, the electronic control unit 12 obtains the rotation speed VC of the crank 50 and calculates the correction value corresponding to the rotation speed VC of the crank 50 using the correction map of FIG. 13. Then, the electronic control unit 12 calculates a corrected predetermined angle XAC by subtracting the correction value from the predetermined angle XA. The electronic control unit 12 determines step S35 of FIG. 5 based on the predetermined angle XAC instead of the predetermined angle XA.

Other Embodiments

The above description illustrates embodiments of the bicycle controller and the bicycle controlling method according to the present invention and is not intended to be restrictive. The bicycle controller and the bicycle controlling method of the present invention can be modified as follows. Further, two or more modified examples can be combined.

Two or more of the first to fourth embodiments can be combined. In the first embodiment, the electronic control unit 12 is configured to decrease the predetermined angle XA in a stepped manner as the angular position of each crank arm 54 at which the manual driving force TH becomes less than or equal to the predetermined threshold value XT becomes farther from the top or bottom dead center. Also, the electronic control unit 12 is configured to increase the predetermined angle XA in a stepped manner as the angular position of the crank arm 54 at which the manual driving force TH becomes less than or equal to the predetermined threshold value XT becomes closer to the top or bottom dead center. The electronic control unit 12 can use, for example, a map shown in FIG. 4, in which the angular position of the crank arm 54 is associated with the predetermined angle XA, instead of the map shown in FIG. 4.

Figure 14:
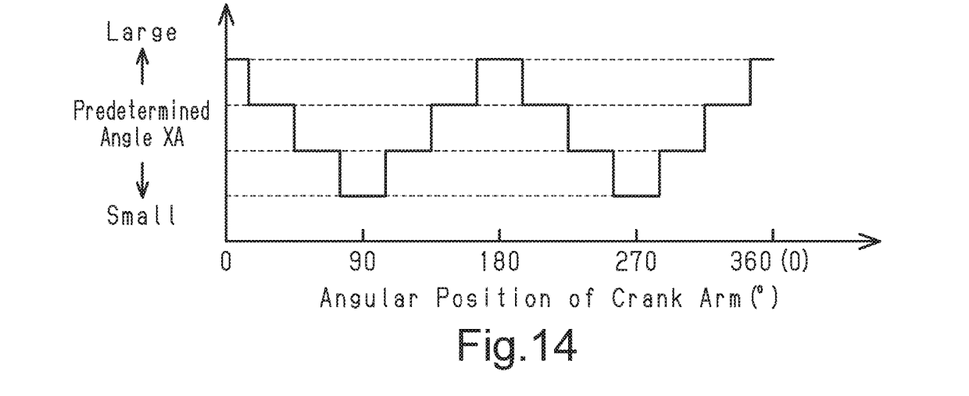
FIG. 14 is a map in accordance with the angular position of the crank arm associated with the predetermined angle in a modified example of a bicycle controller.

As shown in FIG. 14, the electronic control unit 12 is configured to decrease the predetermined angle XA in three steps as the angular position of the crank arm 54 is moved from 0° toward 90°, and to increase at in three steps as the angular position of the crank arm 54 is moved from 90° toward 180°. Any number of steps can be set. There can be two steps or four steps or more.

Figure 4:
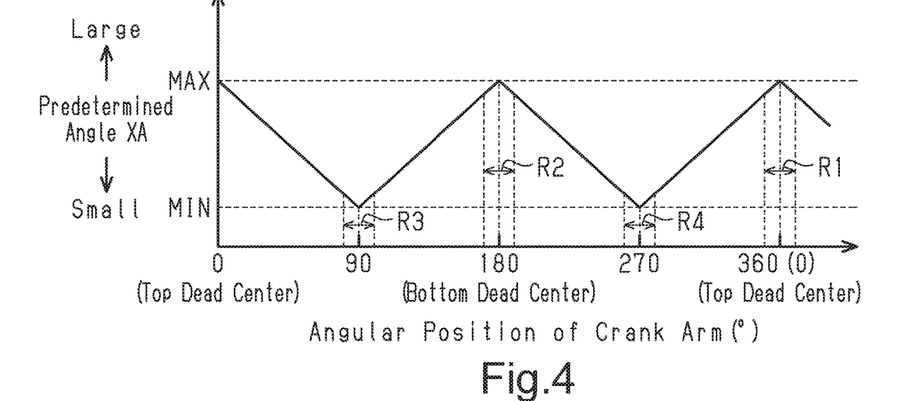
FIG. 4 is a map showing the angular position of a crank arm associated with a predetermined angle.
Figure 5:
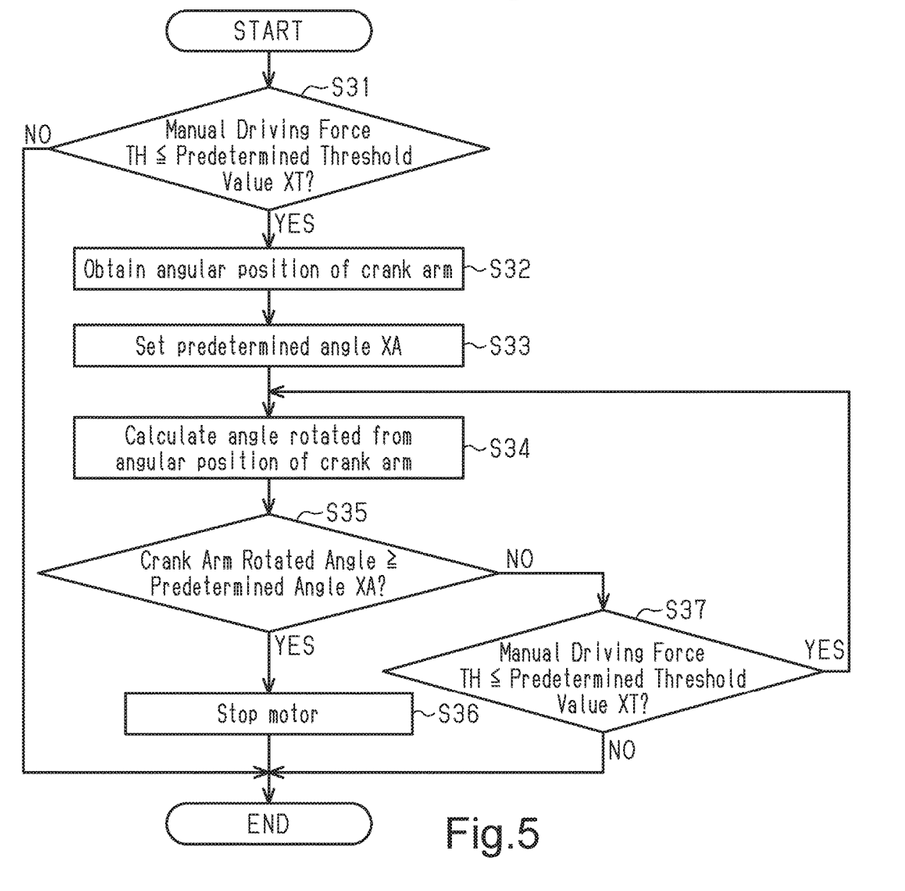
FIG. 5 is a flowchart in accordance with a third assist stopping process executed by the electronic control unit.

In the second embodiment, the map shown in FIG. 4, in which the angular position of the crank arm 54 is associated with the predetermined angle XA, can be modified. The electronic control unit 12, for example, advances or retards the angular position of the crank arm 54 corresponding to the predetermined angle XA from the angular position of the crank arm 54 shown in FIG. 4 based on the inclination angle D. When the inclination angle D is greater than 0°, the electronic control unit 12 retards the angular position of the crank arm 54 corresponding to the predetermined angle XA from the angular position of the crank arm 54 shown in FIG. 4 in accordance with the degree of the inclination angle D. When the inclination angle D is less than 0°, the electronic control unit 12 advances the angular position of the crank arm 54 corresponding to the predetermined angle XA from the angular position of the crank arm 54 shown in FIG. 4 in accordance with the degree of the inclination angle D.

In the second embodiment, when the inclination angle D is greater than 0°, the angular position of the crank arm 54 can be retarded by an amount that is increased in a stepped manner as the inclination angle D increases. Also, when the inclination angle D is smaller than 0°, the angular position of the crank arm 54 can be advanced by an amount that is increased in a stepped manner as the inclination angle D decreases.

In each embodiment, the electronic control unit 12 can change the predetermined threshold value XT of the manual driving force TH in accordance with operation performed by the user. In this case, the predetermined threshold value XT is changed, for example, with the operation unit of the bicycle or an external device in a case that the bicycle controller 10 includes a port configured to be connected to an external computer. Alternatively, the electronic control unit 12 can store a profile of the manual driving force TH when the rider rotates the crank 50 over a predetermined number of times and changes the threshold value XI based on the profile.

In each embodiment, the electronic control unit 12 can obtain the inclination angle D from a GPS. The electronic control unit 12 receives information of the inclination angle D from the GPS, for example, through a cyclocomputer or a smartphone. Additionally, the electronic control unit 12 can obtain the inclination angle D from an input of the operator.

The inclination detector 38 can be omitted from the first, third, and fourth embodiments of the bicycle controller 10.

What is claimed is:

1. A bicycle controller comprising:
an electronic control unit that controls a motor, which assists pedaling of a bicycle, based on a manual driving force and angle information related to an angle of a crank of the bicycle,
the electronic control unit is configured to stop the motor upon determining the crank is rotated by a predetermined angle or greater in a state where the manual driving force is less than or equal to a predetermined threshold value while the motor is driven.

2. The bicycle controller according to claim 1, wherein the crank includes a crank arm, and
the angle information includes information related to an angular position of the crank arm.

3. The bicycle controller according to claim 2, wherein the electronic control unit is configured to change the predetermined angle in accordance with the angular position of the crank arm at which the manual driving force becomes less than or equal to the predetermined threshold value.

4. The bicycle controller according to claim 3, wherein the electronic control unit is configured to change the predetermined angle to be smaller in a state where the manual driving force becomes less than or equal to the predetermined threshold value under a condition in which the crank arm is located in a third range including a rotational position where the crank arm is separated from the top dead center by 90° or a fourth range including a rotational position where the crank arm is separated from the bottom dead center by 90° as compared to a state in which the manual driving force becomes less than or equal to the predetermined threshold value under a condition in which the crank arm is located in a first range including a top dead center or a second range including a bottom dead center.

5. The bicycle controller according to claim 3, wherein the electronic control unit is configured to decrease the predetermined angle as the angular position of the crank arm at which the manual driving force becomes less than or equal to the predetermined threshold farther from a top or bottom dead center, and
the electronic control unit is configured to increase the predetermined angle as the angular position of the crank arm at which the manual driving force becomes less than or equal to the predetermined threshold value becomes closer to the top or bottom dead center.

6. The bicycle controller according to claim 5, wherein the electronic control unit is configured to decrease the predetermined angle in a stepped manner as the angular position of the crank arm at which the manual driving force becomes less than or equal to the predetermined threshold value becomes farther from the top or bottom dead center, and
the electronic control unit is configured to increase the predetermined angle in a stepped manner as the angular position of the crank arm at which the manual driving force becomes less than or equal to the predetermined threshold value becomes closer to the top or bottom dead center.

7. The bicycle controller according to claim 2, wherein the electronic control unit is configured to correct a corresponding relationship between the angular position of the crank arm, relative to a frame of the bicycle, and a top or bottom dead center of the crank arm based on an inclination angle of the bicycle.

8. The bicycle controller according to claim 7, further comprising:
an inclination detector that detects the inclination angle of the bicycle.

9. The bicycle controller according to claim 1, wherein the electronic control unit is configured to change the predetermined angle in accordance with a rotation speed of the crank.

10. The bicycle controller according to claim 9, wherein the electronic control unit is configured to decrease the predetermined angle as the rotation speed of the crank increases.

11. The bicycle controller according to claim 1, wherein in a state where the manual driving force is decreasing, the electronic control unit is configured to change a response speed of the motor with respect to a change in the manual driving force in accordance with a deceleration rate of the crank.

12. The bicycle controller according to claim 11, wherein the electronic control unit is configured to increase the response speed of the motor with respect to a change in the manual driving force as the deceleration rate of the crank increases.

13. The bicycle controller according to claim 1, wherein the electronic control unit is configured to stop the motor in a state where a rotation speed of the crank is less than or equal to a predetermined speed.

14. The bicycle controller according to claim 9, further comprising:
a speed detector that detects a rotation speed of the crank.

15. The bicycle controller according to claim 1, further comprising:
a crank sensor that outputs the angle information.

16. A bicycle controlling method that controls a motor, which assists pedaling of a bicycle, based on a manual driving force and angle information related to an angle of a crank of the bicycle, the bicycle controlling method comprising:
stopping the motor if the crank is rotated by a predetermined angle or greater in a state where the manual driving force is less than or equal to a predetermined threshold value while the motor is driven.

* * * * *